April 23, 1929.  J. J. MASCUCH  1,710,175
AUTOMOBILE BUMPER
Original Filed Nov. 12, 1926  2 Sheets-Sheet 1

INVENTOR.
Joseph J. Mascuch
BY M. H. Loughridge
ATTORNEY.

April 23, 1929.  J. J. MASCUCH  1,710,175
AUTOMOBILE BUMPER
Original Filed Nov. 12, 1926  2 Sheets-Sheet 2
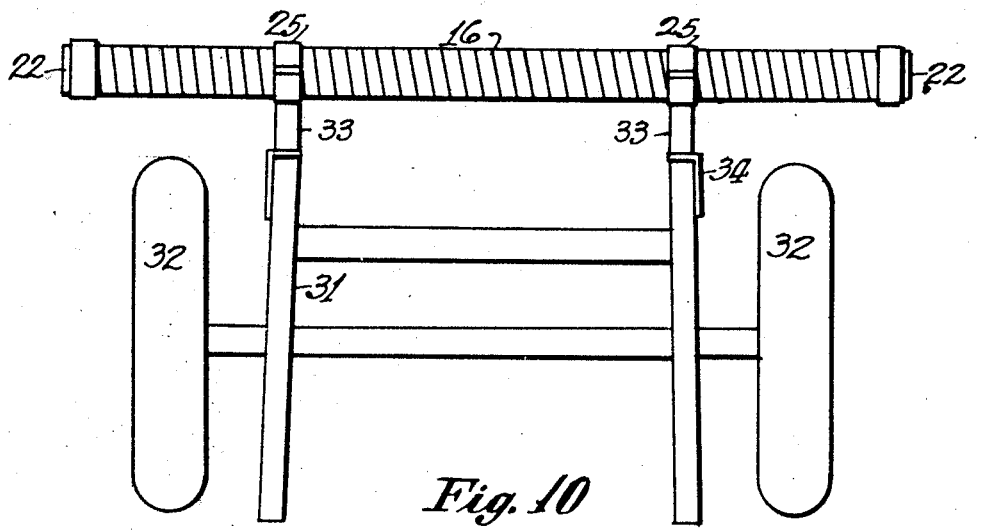
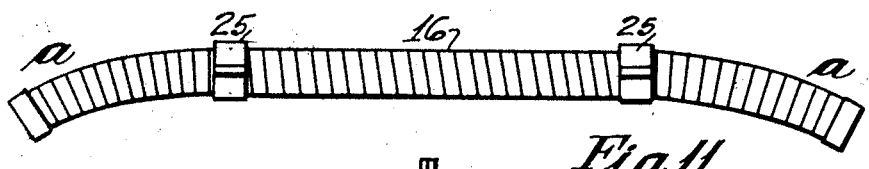
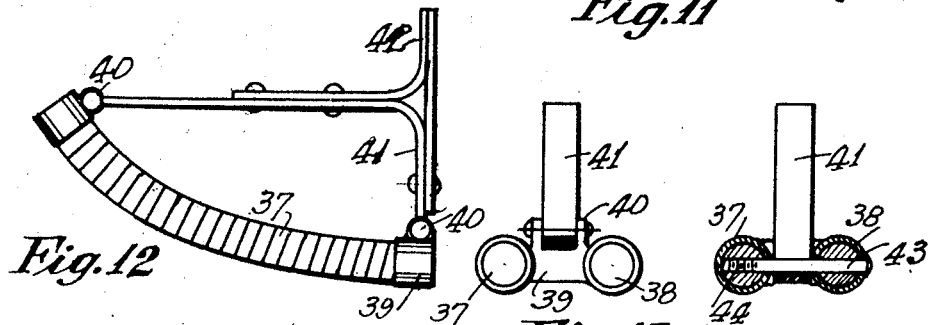
INVENTOR.
Joseph J. Mascuch
BY
M. H. Loughridge
ATTORNEY.

Patented Apr. 23, 1929.

1,710,175

UNITED STATES PATENT OFFICE.

JOSEPH J. MASCUCH, OF EAST ORANGE, NEW JERSEY.

AUTOMOBILE BUMPER.

Application filed November 12, 1926, Serial No. 147,918. Renewed December 14, 1928.

Figure 1:
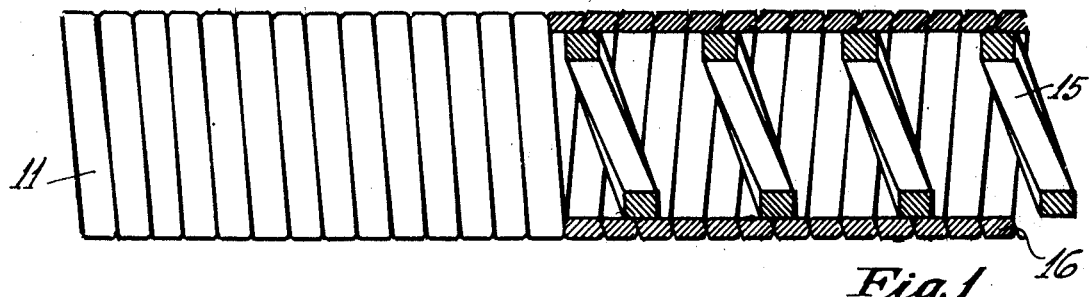
Figure 2:
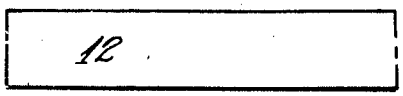
Figure 4:
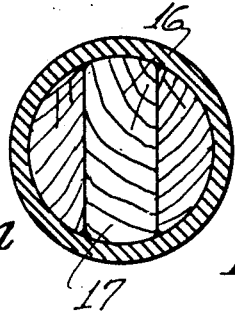
Figure 5:
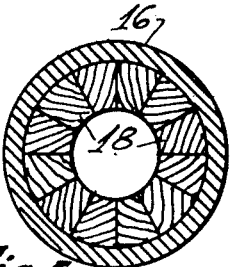
Figure 6:
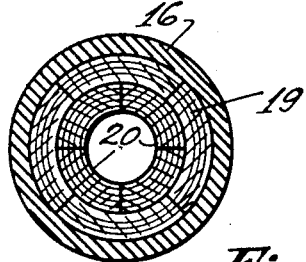
Figure 7:
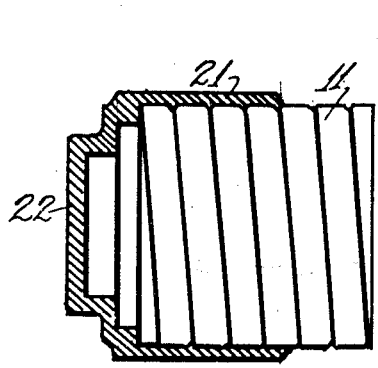
Figure 8:
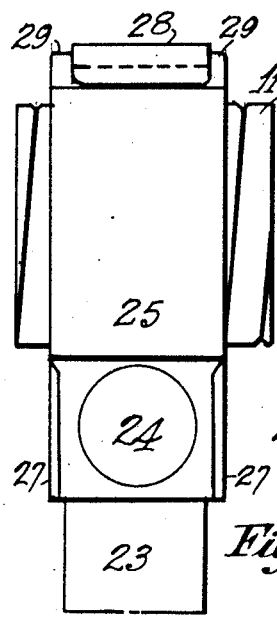
Figure 9:
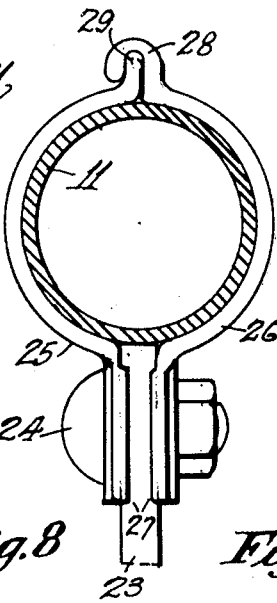

This invention relates to automobile bumpers and to the brackets by which the bumpers are secured to the chassis of the automobile, and has for an object to provide an impact member of flexible tubing with suitable stiffening members embodied in the tubing, to provide an impact member made from rolled strip stock which is finished before forming into its ultimate shape, to provide a plurality of tubular impact members spaced in vertical relation by suitable end brackets and to provide suitable brackets for supporting an impact member of this class. Other objects of the invention will appear from the following specification and claims and the accompanying drawings, in which Fig. 1 shows a flexible metallic tube, partly in section, that forms the impact member of the bumper, Fig. 2 is a strip of stock from which the tube is formed by a rolling process having overlapped and interlocked layers as shown in section in Fig. 3. Figs. 4, 5 and 6 are cross-sections of the impact member showing a variety of arrangements for giving rigidity to the tubing, Fig. 7 is a detail showing in section one form of end cap for the tubing, Figs. 8 and 9 show one form of clamp that may be used to secure the impact member to the supporting bracket, Fig. 10 shows the impact member in place in front of an automobile, Fig. 11 is another form of impact member having curved ends, Fig. 12 is a rear bumper or fender guard for one side of the rear of the vehicle, Figs. 13 and 14 show an arrangement of brackets for securing a pair of impact members to the supporting bracket and Fig. 15 is a side elevation of one form of attaching bracket for the front impact bar.

It has been common practice to apply a piece of piping in front of a vehicle to receive the impacts and protect the vehicle. Piping that will resist the usual shocks in service is so heavy that it loses its resiliency and on the other hand, piping that is light, is readily dented and kinked and distorted out of shape. To overcome these difficulties and to reduce the cost of manufacture the present invention proposes to use flexible metallic tubing for the impact member which cannot be dented or kinked and is provided with an internal filler to give it the degree of resiliency desired. Tubing of this type is rolled to form from strip stock in a spiral and may be wound around a filler with any degree of tightness desired. The finish is applied to the strip stock before it is rolled and as the rolling and forming process does not require heat the finish, such as electro-plating, is not injured in the forming process and the cost of finishing is thereby greatly reduced. The impact members may be secured by suitable clamps to the supporting brackets, or may be secured by an eyelet construction.

Metallic tubing of this type is flexible and expansible and an impact at one point cannot cause a permanent set or fracture in the tubing. The spiral groove on the outside of the tubing adds materially to the appearance of the finished bumper.

Figure 3:
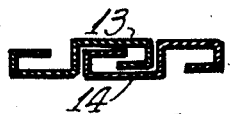

In the drawings 11 is the metallic tubing which is rolled from strip stock as indicated at 12 to the form shown in the enlarged cross-section in Fig. 3 in which 13 is one layer of the spiral and 14 is the succeeding layer. These layers interlock as shown by a process well understood in the art of forming flexible metallic hose and produce a wall composed of four layers of strip in sections which are separated by a portion bent substantially at right angles to the layers and producing a tubular construction having a very high crushing resistance The degree of flexibility of this tubing is regulated by the tightness of the overlapping layers and by the extent of the movement between each layer of the spiral and for the present purpose the tubing itself can be constructed comparatively stiff and rigid.

To increase the rigidity of the tubing and to maintain a comparatively high degree of flexibility a spiral spring 15, preferably of square section stock, is inserted in the tubing and having an exterior diameter normally slightly larger than the interior diameter of the tubing. This spiral is placed under tension to contract its coils until it is inserted in place and when the tension is released it is tightly secured in the tubing by the walls 16 and the rigidity of the tubing is increased by the rigidity of the coil spring and by the friction set up between the coil spring and the tubing to any lateral movement that a deflection of the tubing may cause between these parts.

An alternative way of securing rigidity of the tubing is shown in Fig. 4 in which the spiral walls 16 are tightly wound upon the wooden core 17. In this case the resiliency of the bumper would practically be the resiliency of the wooden core. In Fig. 5 a radially constructed wooden core 18 is used as the stiffening member and, in Fig. 6 the stiffening core may be made of longitudinal layers of vulcanized fibre or bamboo overlapping each other as indicated at 19 and 20.

An end cap is provided for the tubular impact member as indicated at 21, Fig. 7. Advantage is taken of the spiral thread on the tubing to thread these caps in place. The outer end of the cap 22 may be formed in any suitable design as for instance, to correspond with the hub caps of the vehicle.

The clamp in Figs. 8 and 9 comprises the supporting bracket 23 with the clamping plates 25 and 26 which enclose the impact member 11. The edges of these clamping plates are deflected at 27 to form a pocket for the supporting bracket 23 to which they are secured by the bolt 24. On the opposite side, the member 25 has an upstanding ridge with raised lugs at 29 and the member 26 has a turned over end at 28 which engages the upstanding ridge of 25 between the lugs 29. This securely locks the two members of the clamp together without bolts and without the possibility of the parts moving relative to each other.

In Fig. 10 the front impact member 16 extends in front of the wheels 32 and is secured to the chassis 31 by the supporting brackets 33 and 34. This style of bumper can be permanently deflected by deflecting the core. For instance, in Fig. 11, the impact member 16 can be curved at the ends $a$ as indicated by correspondingly deflecting the core of the tube. This construction is rather difficult, if not impossible with ordinary pipe impact bars.

A bumperette for the rear of a vehicle is shown in Fig. 12 in which the impact member 37 is permanently curved as shown and is connected by the eyelets 40 to the supporting bracket 41—42.

The general practice in bumper construction is to use a plurality of impact bars so as to increase the effective area of the bumper. These bars are spaced in vertical relation, one above the other and may be secured as indicated in Figs. 13 or 14. The end caps 39 form a spacing bracket for the bars 37 and 38 with the eyelet 40 formed integral therewith to receive the eye of the bar 41 constituting the supporting bracket. In Fig. 14 the bars 37 and 38 are connected by a bolt 43 which is threaded into a filler 44 in tube 37. An eye on the bar 41 engages the bolt 43 forming the support for the device.

The supporting bracket Fig. 15 comprises the U-shaped member 33 which is clamped to the impact bar and which has a turned over end at 35 resting upon the right angle projection 36 of the member 34 which is bolted to the frame. The U-shaped bracket 33 has a certain amount of resiliency when made from spring stock and is located in position to receive impacts from other bumpers out of the plane of the impact bar.

Having thus described my invention, I claim:

1. A vehicle bumper as described comprising an impact member made from a resilient member formed to the contour of the bumper and tightly incased in flexible tubing.

2. A vehicle bumper as described comprising an impact member made from an open resilient member formed to the contour of the bumper and tightly incased in flexible tubing co-operating with said member to form the impacting member of the bumper.

3. A vehicle bumper as described comprising an impact member made from a resilient member formed to the contour of the bumper and held under tension by an incasing flexible metallic tube.

4. A vehicle bumper as described comprising an impact member made in tubular form from strip stock with a plurality of layers of said strip forming the walls of said tube and tightly enclosing a resilient member formed to the contour of the bumper.

5. A vehicle bumper as described comprising an impact member made from flexible tubing with a resilient member tightly inserted in said tubing.

6. A vehicle bumper as described comprising an impact member made from flexible tubing formed in a spiral from strip stock and tightly fitting around another member formed in a spiral.

7. A vehicle bumper as described comprising an impact member made from flexible metallic tubing and a coil spring inserted in said tubing to increase the rigidity of the tubing.

8. A vehicle bumper as described comprising an impact member made from flexible metallic tubing and a coil spring normally of greater diameter than the inside diameter of said tube inserted in said tube to increase its rigidity.

9. A vehicle bumper as described comprising an impact member made from flexible metallic tubing and a coil spring formed of square section stock inserted in said tubing to increase its rigidity.

10. A vehicle bumper as described comprising an impact member made from flexible metallic tubing with a spiral groove on its exterior and a cap for the end of said tubing threaded on said spiral.

11. A vehicle bumper as described comprising an impact member made from flexible metallic tubing and a coil spring in said tubing formed to the contour desired in said impact member.

12. A vehicle bumper as described comprising a plurality of flexible tubular impact members with resilient cores formed to the contour of the bumper and end caps for said members, holding said members in vertical spaced relation.

13. A vehicle bumper as described comprising a plurality of tubular impact members and end caps for said members, said end caps holding said members in vertically spaced relation and an eyelet co-operative with said end caps engaging a supporting bracket.

14. A vehicle bumper as described comprising a plurality of tubular impact members spaced in vertical relation one above the other, a supporting bracket with an eye opposite the space between said impact members and a member securing said impact members together and engaging said eye.

15. A support for the impact member of a vehicle bumper comprising a pair of clamps supported by the vehicle frame and clamping the impact member, the ends of said clamps being formed for locking engagement with each other on one side and secured by a bolt on the other side.

16. A support for the impact member of a vehicle bumper comprising a pair of clamps supported by the vehicle frame and clamping the impact member, the end of one of said clamps being turned over to engage a projection in the end of the other clamp and the opposite ends of said clamps bolted to a supporting bracket.

17. A support for the impact member of a vehicle bumper comprising a pair of clamps clamping the impact member and having projecting ends, said ends forming a pocket to receive a supporting bracket and means for securing said ends to said bracket.

18. A support for the impact member of a vehicle bumper comprising a pair of clamps supported by the vehicle frame and clamping the impact member, the end of one of said clamps being turned over to engage a projection in the end of the other clamp and lugs formed in one of said ends to prevent lateral movement of said clamping members.

19. A support for a tubular impact member of a vehicle bumper comprising a pair of clamps supported by the vehicle frame and formed to clamp around the tubular impact member, one of said clamps formed with a notched projecting end on the diametrical line of said impact member and the end of the other clamp formed to engage said notch and means securing the opposite ends of said clamps to a supporting bracket.

20. A supporting bracket for a vehicle bumper comprising a flat bar for securing to the side of the vehicle frame with the end turned horizontally at right angles, a U-shaped member made from flat bar stock with one end turned over to rest upon the turned end of the securing bar and secured thereto and the opposite end clamped to the impact member of the bumper.

In testimony whereof I affix my signature.

JOSEPH J. MASCUCH.